US006573920B2

(12) United States Patent
Shimoda et al.

(10) Patent No.: US 6,573,920 B2
(45) Date of Patent: Jun. 3, 2003

(54) METHOD OF MANUFACTURING A PRINTER WITH AN ELECTROLUMINESCENT (EL) PIXEL ARRAY

(75) Inventors: Tatsuya Shimoda, Suwa (JP); Takao Nishikawa, Suwa (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/244,188

(22) Filed: Sep. 16, 2002

(65) Prior Publication Data
US 2003/0016281 A1 Jan. 23, 2003

Related U.S. Application Data

(62) Division of application No. 09/606,838, filed on Jun. 28, 2000, now Pat. No. 6,480,212.

(30) Foreign Application Priority Data

Jul. 2, 1999 (JP) ............................................. 11-189699

(51) Int. Cl.[7] ......................... B41J 2/385; G03G 13/04; G03G 15/00
(52) U.S. Cl. ....................... 347/129; 347/130; 347/242; 399/159; 438/21
(58) Field of Search ................................ 347/129, 238, 347/237, 130, 242, 116; 399/301, 300, 223, 318, 298, 310, 311, 312, 159; 438/21

(56) References Cited

U.S. PATENT DOCUMENTS

| 5,047,791 A | 9/1991 | Jamzadeh et al. |
| 5,101,137 A | 3/1992 | Kun et al. |
| 5,237,339 A | 8/1993 | Ichikawa |
| 5,276,486 A | 1/1994 | Ohno et al. |
| 5,291,246 A | 3/1994 | Tsukamoto |
| 5,335,007 A | 8/1994 | Choi |
| 5,708,930 A | 1/1998 | Nagase et al. |
| 5,978,628 A | 11/1999 | Rees |
| 6,021,301 A | 2/2000 | Shigeta et al. |
| 6,205,311 B1 | 3/2001 | Maess |

FOREIGN PATENT DOCUMENTS

| JP | 5-57953 | 3/1993 |
| JP | 5-57954 | 3/1993 |
| JP | 6-95456 | 4/1994 |

Primary Examiner—Susan S. Y. Lee
(74) Attorney, Agent, or Firm—Mark P. Watson

(57) ABSTRACT

A method of manufacturing a printer with an EL pixel array as a latent image light source, comprising: forming an EL pixel array on a substrate; separating the EL pixel array from the substrate; affixing the separated EL pixel array to substantially completely surround the outside of a photoconductive drum; forming a charge generating layer above the EL pixel array; and forming a charge transfer layer above the charge generating layer.

1 Claim, 7 Drawing Sheets

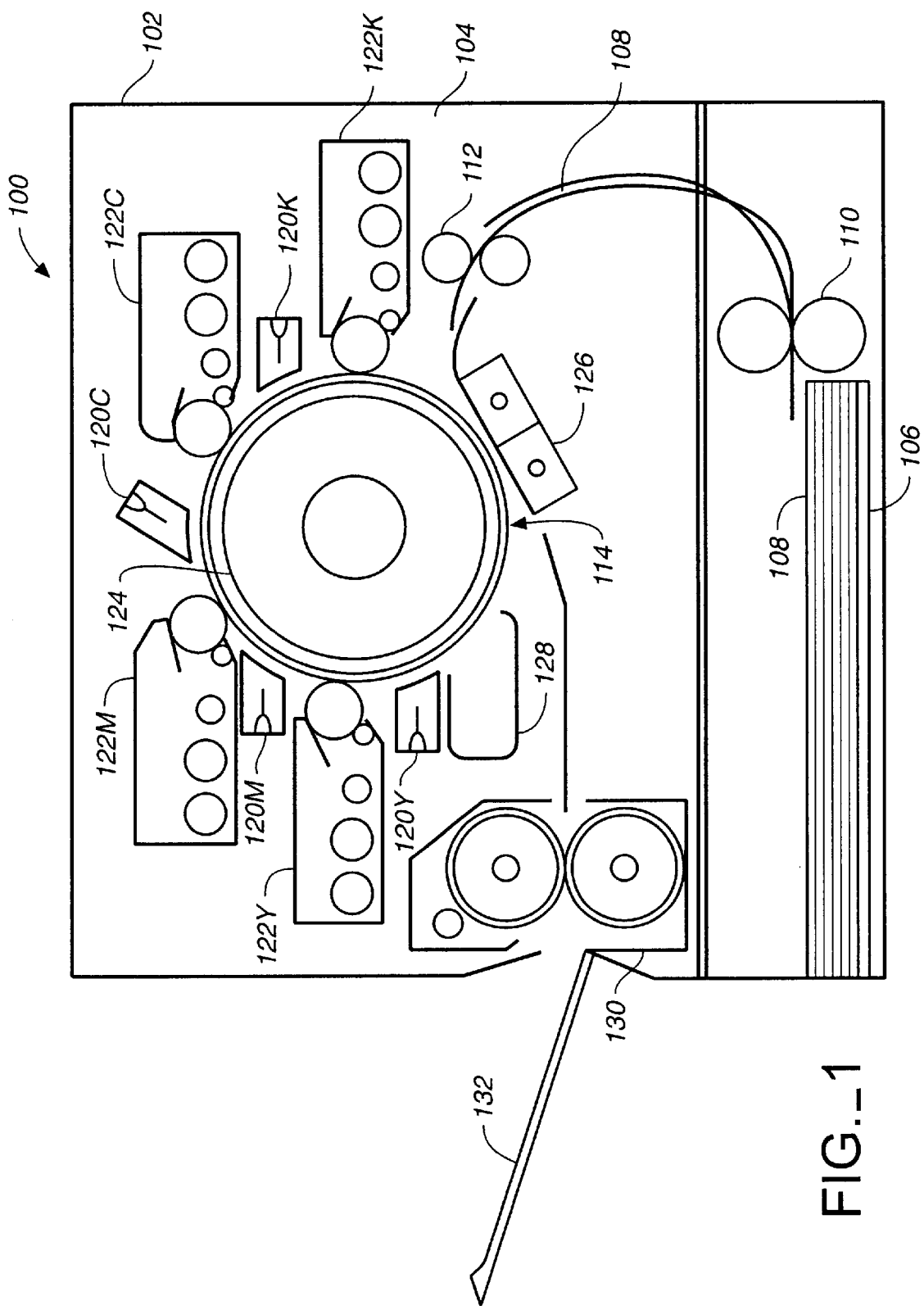
FIG._1

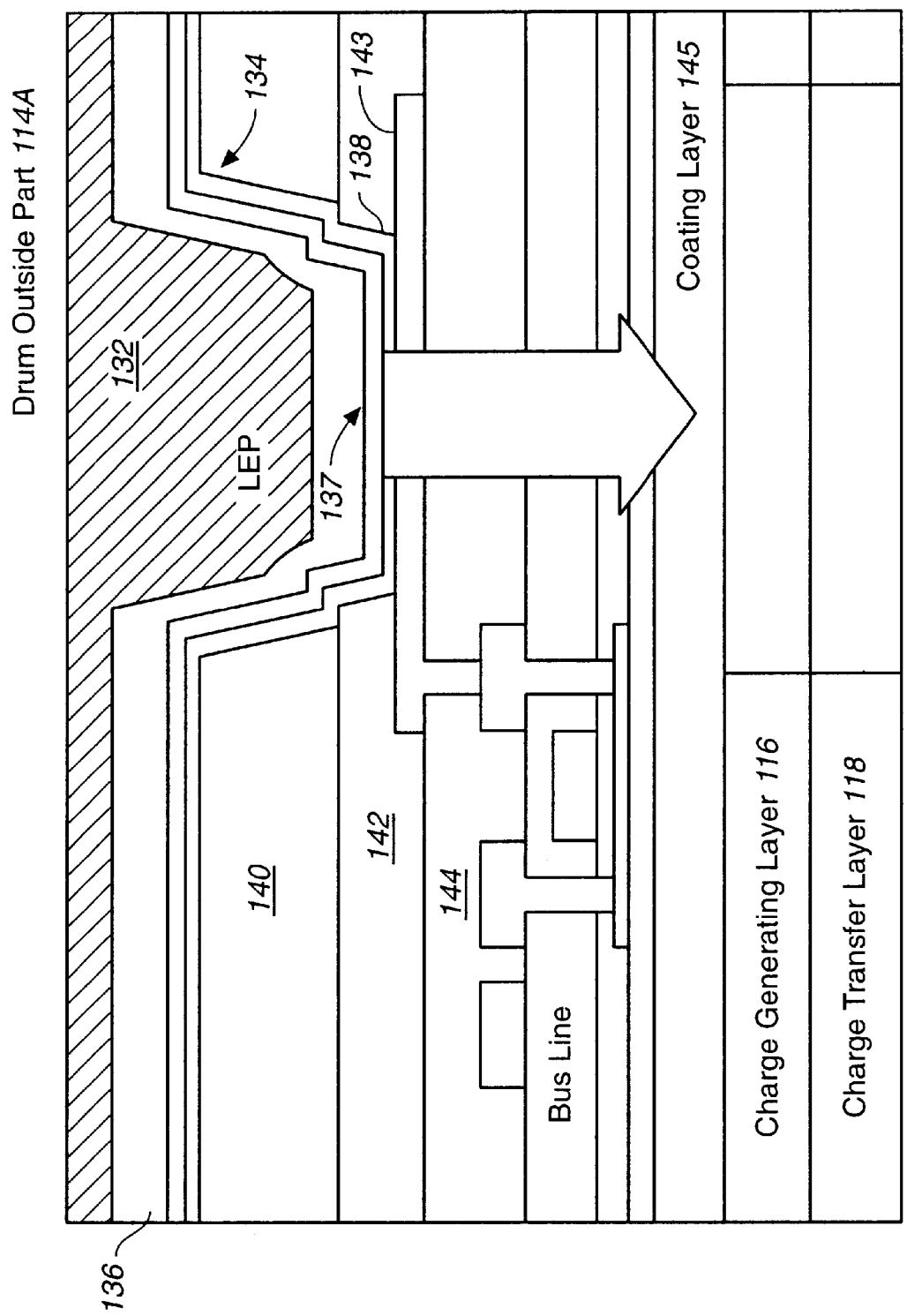
FIG._2

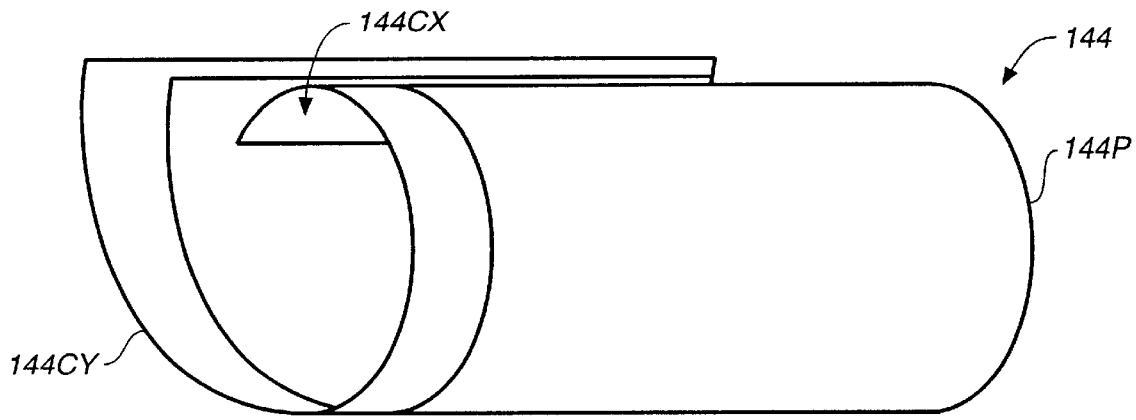
FIG._3A
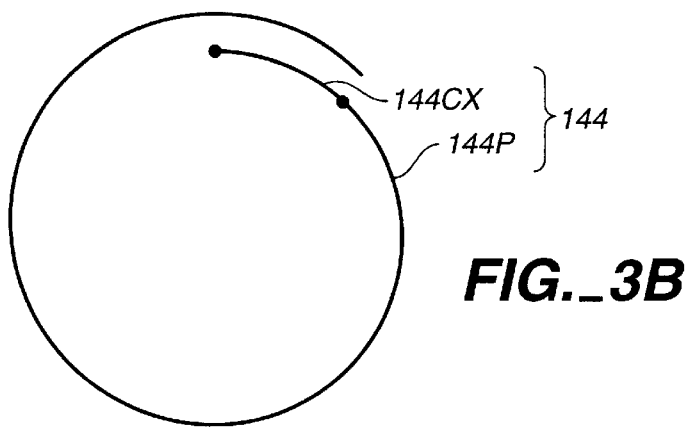
FIG._3B
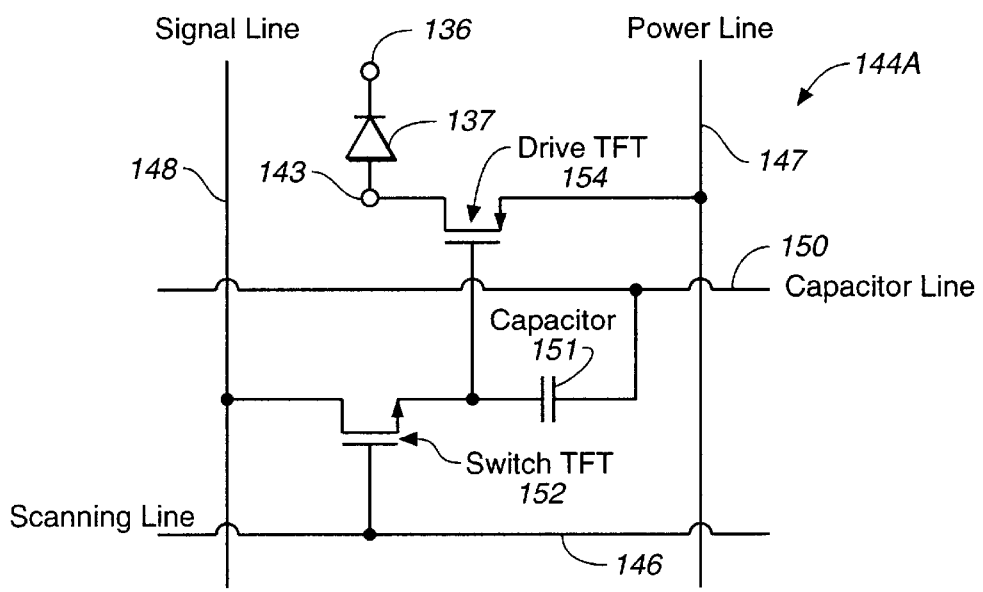
FIG._4

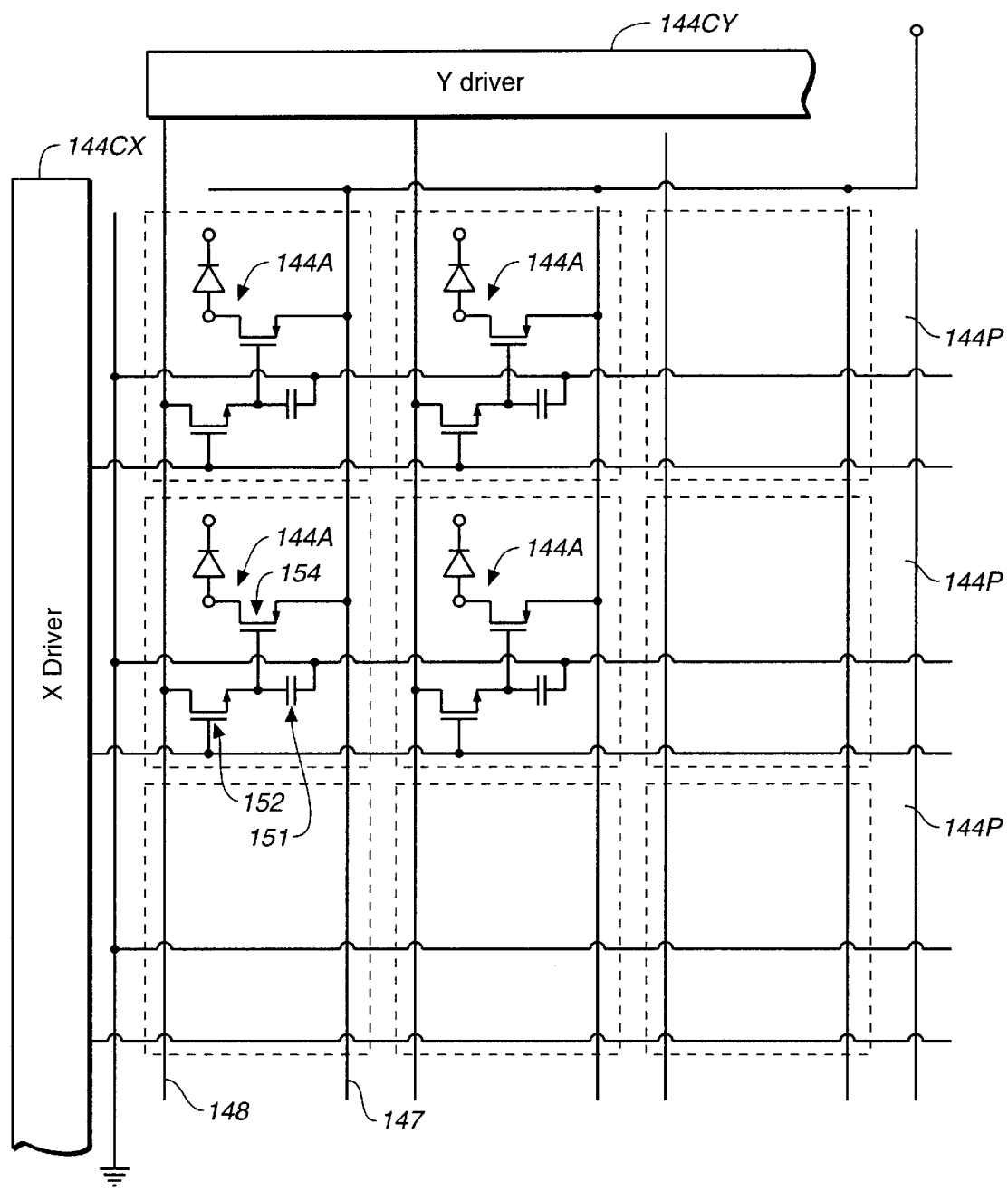
FIG._5

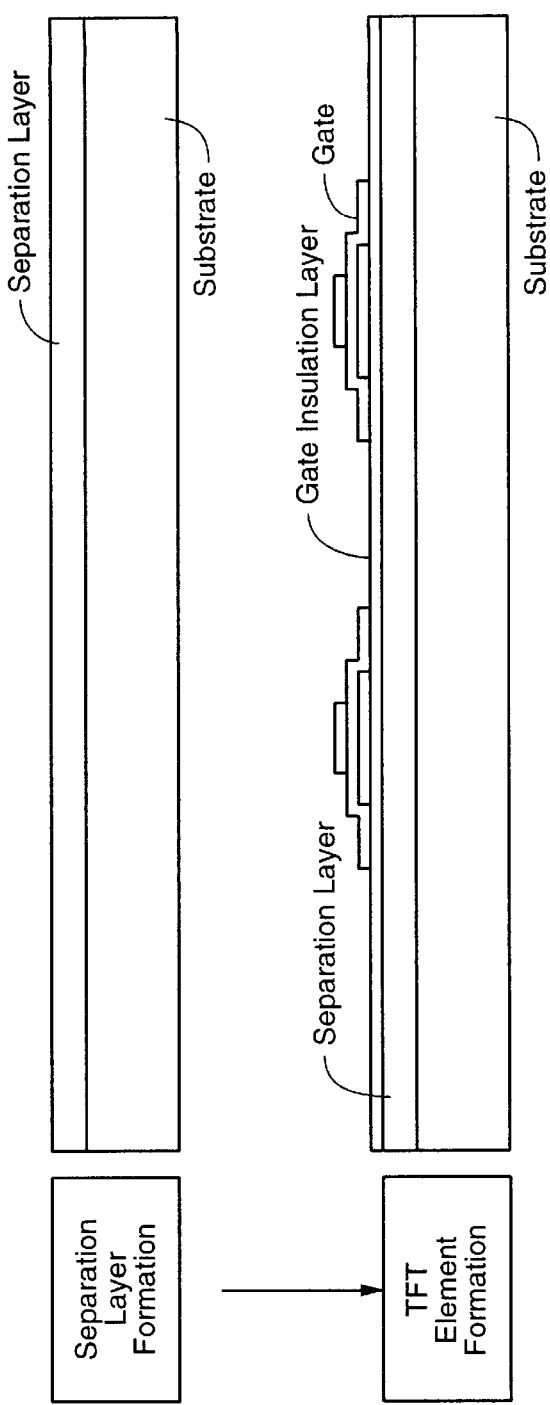

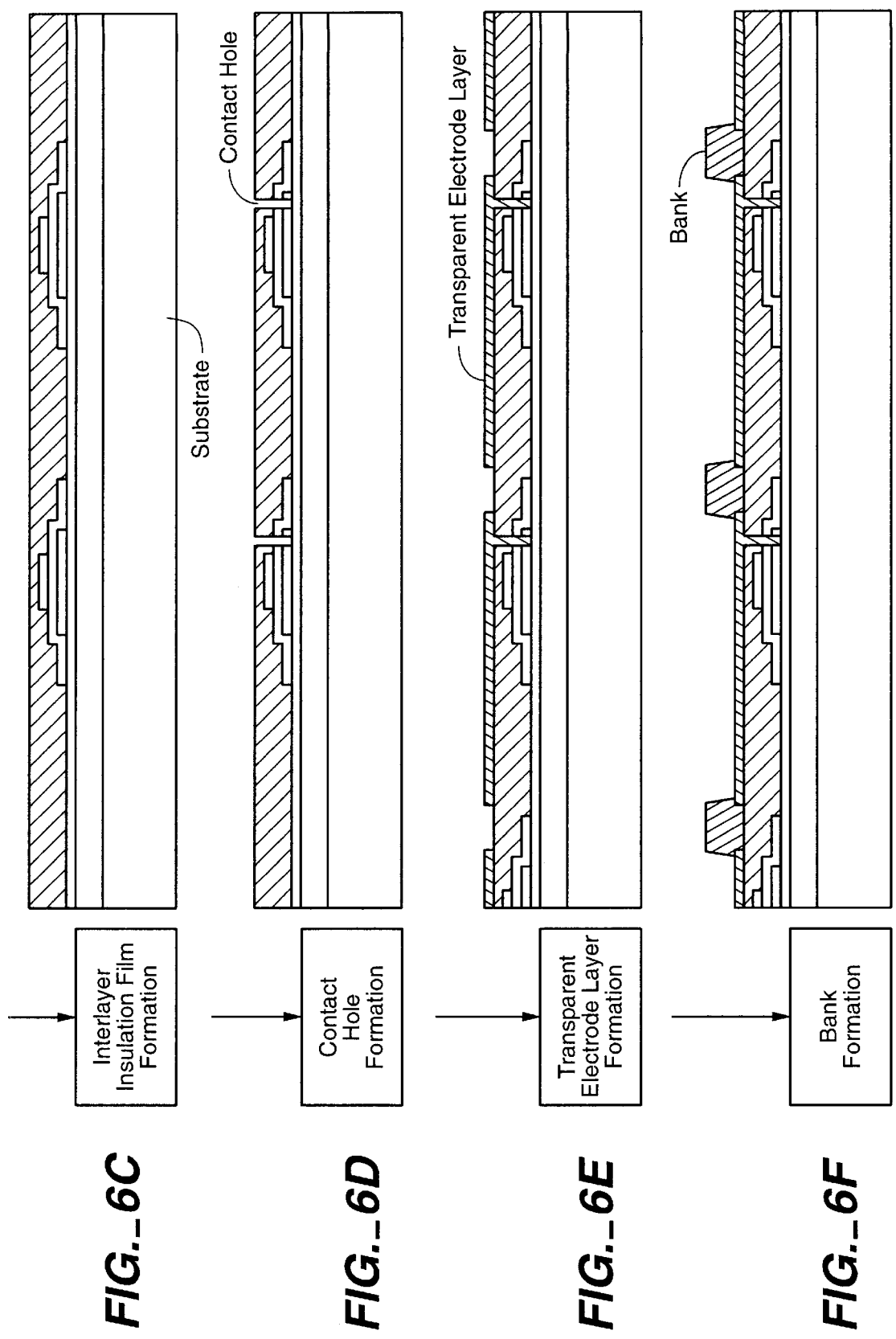

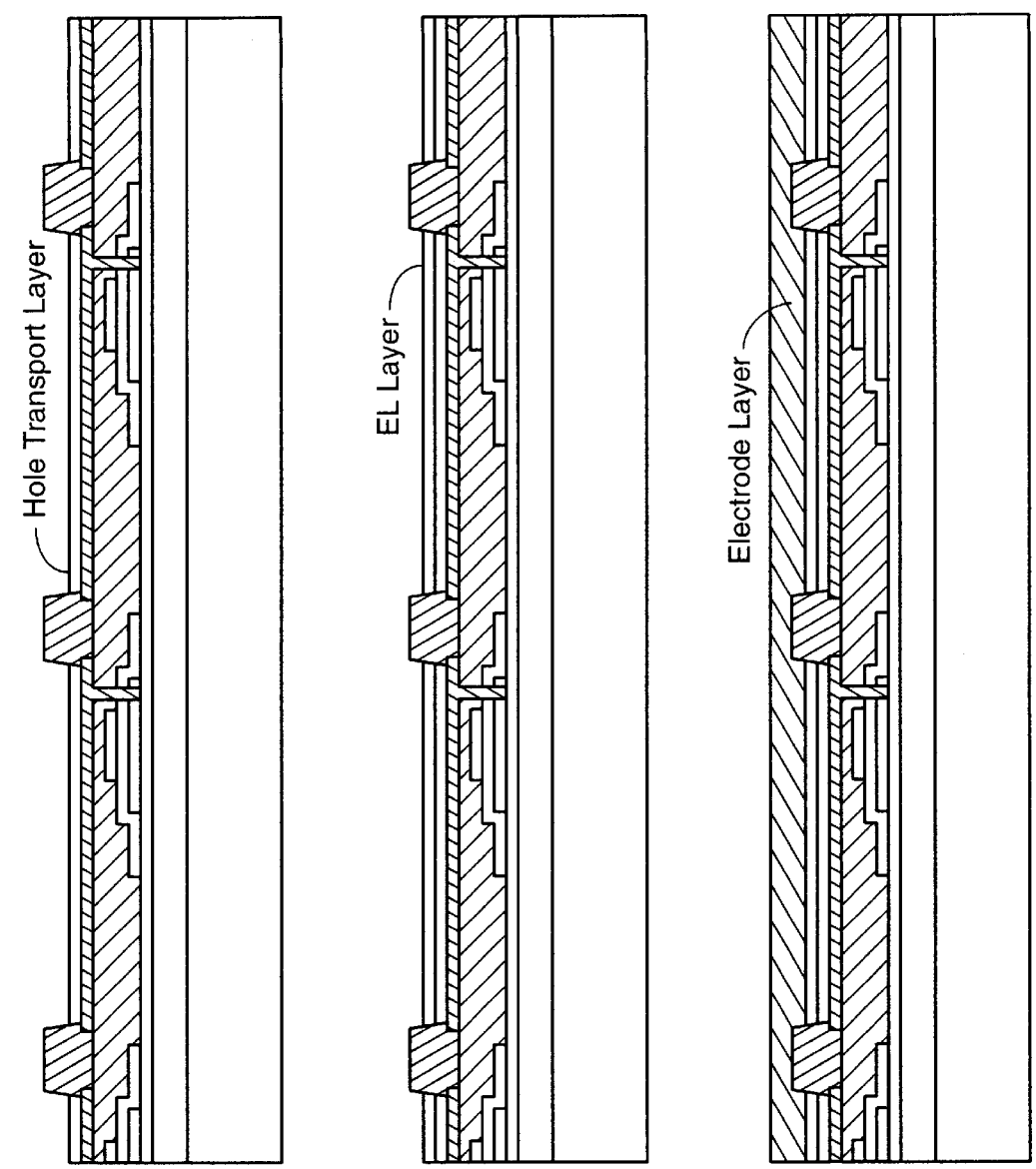

METHOD OF MANUFACTURING A PRINTER WITH AN ELECTROLUMINESCENT (EL) PIXEL ARRAY

CONTINUING APPLICATION DATA

This application is a divisional application of U.S. patent application Ser. No. 09/606,838, filed Jun. 28, 2000, U.S. Pat. No. 6,480,212, the contents of which are incorporated herein in their entirety by reference.

BACKGROUND OF THE INVENTION

1. Field of the Invention

The present invention relates to an electronic printer that uses an electroluminescent display such as an organic-inorganic electroluminescent display panel.

2. Description of the Related Art

A color imaging technique known as the KNC process directly overlays color toner images on a photoconductive drum by repeatedly charging, exposing, and reverse developing the toner images on the photoconductive drum, and then batch transfers the overlaid toner images to a transfer medium in a single step.

A feature of this process is in the use of a subtractive color mixture for directly overlaying toner images on the photoconductive drum, thereby forming and developing one latent image on top of the previous image(s). Image exposure can be accomplished from either the inside or outside of the photoconductive drum.

A subtractive color mixture for overlaying the toner images is needed to form a color image.

The wavelength usable for image exposure is limited with external image exposure techniques because the toner image is already on the photoconductive drum. However, with methods in which the second image is exposed from inside the photoconductive drum (internal exposure), a latent image can be formed without being affected by light cover by the toner layer on the photoconductive drum. It is therefore only necessary to compensate for the toner layer potential, and color compensation is greatly reduced.

The photoconductor used in this internal exposure method is typically a drum and an LED head is typically used for the light source instead of laser optics because downsizing and positioning are easier. The drum diameter can be reduced 30% to 40% compared with an external exposure method. Positioning precision and toner image overlaying are also improved with internal development because the images are exposed from inside the drum by an LED unit disposed inside the transparent drum.

A compact, high speed color printer in which positioning precision and color image superimposition are improved in principle can thus be achieved with an internal development method combined with a compact LED head optical system.

While toner dispersion and image shifting are problems with image transfer techniques, these are reduced by single image transfer, which is thus suited to higher image quality and does not have the limitations imposed by a transfer medium. However, when an LED unit is used for the light source in an internal image exposure technique, it is necessary to gather light from the LED unit for primary scanning (axially to the drum). Furthermore, while positioning precision is improved compared with external image exposure, the write timing of each color image is dependent upon the precision of the rotational speed of the drum.

Furthermore, while there are methods whereby it is possible to eliminate primary scanning by using the LED unit as a line light source, LED alignment precision is relatively low at approximately +/−50 µm, LED pitch is relatively coarse, and such methods are unsuitable for use in a high precision printer.

The present invention was therefore conceived as a way to solve the above problems by providing a printer in which the positioning of each color image is dramatically improved and movement such as for primary scanning is not required by the light source used for internal image development.

SUMMARY OF THE INVENTION

The present invention is a printer having applied as a latent image light source an EL (electroluminescent) pixel array comprising a base layer having at least a light emitting layer, electrode layers on one side of the base layer, and a TFT (thin-film transistor) layer having a circuit part for controlling light emission of the light emitting layer by applying a predetermined voltage between the electrode layers, and a plurality of pixel parts layered to the other side of the base layer and segmenting the base layer, enabling light emission control of the light emitting layer in the base layer by producing a potential difference to the electrode layers independently in each segmented area.

Furthermore, the printer has a photoconductive drum, a charger section for charging the outside of the photoconductive drum, a developer section for developing an electrostatic latent image formed by the charger section, and a pressure-applying member pressed with a specific nip pressure to the outside of the photoconductive drum, characterized by having a transfer section for transporting a transfer medium held to the outside of the photoconductive drum, and transferring an image developed by the developer section; and a fixing section disposed to the transfer medium transportation path downstream of the transfer section for fixing the transferred image.

In the above-noted printer, a developer section is disposed at a specific pitch for each of plural colors, a charger section is disposed upstream of each of these plural developer sections, and during one revolution of the photoconductive drum charging, exposing and developing each image at a specific width unit in the circumferential direction corresponding to said specific pitch are repeatedly performed to combine plural color images on the photoconductive drum, and after which the images are transferred to the transfer medium.

Because the pixel array used as the light source is disposed completely around the drum, the relative positions of the positions of each pixel and the position of the drum surface always match. Therefore, by only controlling the pixels arrayed in a matrix, there is no shifting in the position of plural color images. Moreover, because the pixel array used as the light source is on the entire surface of the drum, it is compatible with all exposure methods, including page exposure, scanning exposure, and slit exposure. It should be noted that in the present invention an image of a specific circumferential width is formed at once, and each time developing one color is completed, an image of the next color is formed for this particular image width. As a result, development of plural colors is accomplished with one drum revolution, and plural color images can be overlaid to the drum.

The overlaid image is then transferred to the transfer medium in the transfer section, fixed in the fusing section, and ejected. As a result, less time is needed to process one image when compared with a conventional multiple revolution method or tandem method.

BRIEF DESCRIPTION OF THE DRAWINGS

FIG. 1 is a typical structural view of a printer according to a preferred embodiment of the invention.

FIG. 2 is a section view of an external part containing the internal light source disposed to the outside of the drum.

FIG. 3(A) is an oblique view showing how the TFT layer is wrapped, and (B) is a front view showing how the TFT layer is wrapped.

FIG. 4 is a circuit diagram disposed to each pixel part of the TFT layer.

FIG. 5 is a developed view of the arrangement of pixels on the drum and the circuit diagram.

FIGS. 6A through 6I comprise a production process diagram of the EL display device.

DESCRIPTION OF THE PREFERRED EMBODIMENTS

FIG. 1 shows an internal image exposure type printer 100 according to a preferred embodiment of our invention.

The top part of casing 102 is the engine 104 in which the various components required for image development are assembled. A paper supply tray 106 is provided in the bottom part of the casing 102. A sheet recording medium 108 is stored in the paper supply tray 106. A sheet feeding mechanism (not shown in the figures) located above the paper supply tray 106 feeds the stacked sheet medium 108 one sheet at a time from the top of the stack. The sheet medium 108 is thus held and fed between transportation roller pair 110 and 112 to the engine 104.

The engine 104 has a photoconductive drum 114, which rotates clockwise as seen in FIG. 1 at a constant speed. A charge generating layer 116 and a charge transfer layer 118 (shown in FIG. 2 and further described in detail below) are provided on the surface of photoconductive drum 114 for charge storing (charging).

A charger 120 and developer 122 for each of plural colors, typically cyan (C), magenta (M), yellow (Y), and black (K), are disposed around the photoconductive drum 114. The chargers and developers are typically arranged in the following sequence clockwise around the photoconductive drum 114: yellow charger 120Y and yellow developer 122Y, magenta charger 120M and magenta developer 122M, cyan charger 120C and cyan developer 122C, and black charger 120K and black developer 122K. Each charger 120 positively charges the surface of the photoconductive drum 114, and the corresponding developer 122 then supplies negatively charged toner. In other words, a latent image of each color is formed by internal light source 124, further described below, in the area between the charger 120 and developer 122 of each color on the photoconductive drum 114.

The sheet medium 108 is transported to the transfer section 126 disposed at the bottom of the photoconductive drum 114 in FIG. 1. The transfer section 126 holds the sheet medium 108 against the photoconductive drum 114 with predetermined pressure applied thereto as the sheet medium 108 advances tangentially to the photoconductive drum 114 through the transfer section 126. A predetermined positive voltage is applied to the transfer section 126 at this time to attract the negatively charged toner to the sheet medium 108.

When the transfer process is completed at the transfer section 126, the surface of the photoconductive drum 114 is cleaned as it passes the cleaning section 128. The cleaned surface then returns to the first charging position.

It will thus be obvious that the plural colors required to produce a full color image are developed and transferred to the recording medium with each full revolution of the photoconductive drum 114 in a printer 100 according to this preferred embodiment of our invention.

After passing the transfer section 126, the sheet medium 108 advances to the fixing section 130 where the transferred toner image is fixed by applying heat at a predetermined temperature and predetermined pressure. Once the image is fixed, the sheet medium 108 is ejected from casing 102 and deposited to the eject tray 132.

A surface shaped internal light source array 124 is provided on the inside of the charge generating layer 116 and charge transfer layer 118 surrounding the photoconductive drum 114.

Structure of the Internal Light Source

FIG. 2 shows a cross section at part of the outside surface of the photoconductive drum 114. A pixel array 134 using an electroluminescent device having a TFT transistor, for example, is affixed by an intervening adhesive layer 132 to the outside part 114A of the drum as the internal light source 124.

The EL pixel array 134 comprises in order from the adhesive layer 132: cathode (electrode) layer 136 (an aluminum-lithium alloy), a light emitting layer 137 of an EL material, hole carrier layer 138 (light emitting layer 137 and hole carrier layer 138 together referred to as the base layer), interlayer insulating film 140, adhesive layer 142 (SiO2), anode (electrode) layer 143, and TFT layer 144. It should be noted that the light emitting layer 137 is particularly preferably an organic EL layer.

After affixing the EL pixel array to the drum, a coating layer 145 is formed on the pixel array surface, sequentially forming charge generating layer 116 and charge transfer layer 118, and completing the photoconductive drum 114. An EL pixel arraying using an organic EL layer as the light emitting layer is a self-emitting light-emitting array that can achieve a desired brightness with low power consumption. It is particularly suitable for forming a fine pixel pattern, and is desirable for high resolution image formation.

As shown in FIG. 3 and FIG. 5, the TFT layer 144 is separated into a pixel part 144P and a circuit part 144C, the pixel part 144P being a collection of pixels segmented into a matrix and enabling independent light emission control of the light emitting layer. The circuit part 144C is a driver for light emission control of these pixels, and is disposed on two adjacent sides (X driver 144CX and Y driver 144CY) of the TFT layer 144. It should be noted that essentially the entire circumference of the drum can be made a chargeable area (see FIG. 3) by disposing the X driver 144CX of the circuit part 144C in the TFT layer 144 on the bottom when the EL pixel array 134 is layer wrapped around the drum. It should be noted that while a lip normally results where the layers overlap, steps are taken in the lapped structure to achieve a smooth, unstepped surface. Furthermore, while there is substantially no gap between the edges at the end joint, the location of this end joint gap is preferably at the where drum rotation begins.

The circuit 144A shown in FIG. 4 is contained in the pixel part 144P of the TFT layer 144.

In this circuit 144A, scanning line 146 is a line for transferring signals from the X driver 144CX, and signal line 148 is a line for transferring signals from Y driver 144CY; emitting pixels are selected based on x,y coordinates, and current is supplied to the light emitting layer by way of intervening power line 147 at the selected pixel to drive the desired pixel so that it emits at a predetermined gray scale. Capacitor line 150 is a means for applying the base potential of the capacitor so that the potential from the signal line is stored in capacitor 151.

More specifically, as shown in FIG. 5, each circuit 144A of the pixel part 144P is controlled by the circuit part 144C of the TFT layer 144. That is, scanning line 146 is selected, switching transistor 152 turns on, a signal corresponding to the level of gray scale of the pixel is synchronously supplied from signal line 148 through the source-drain of transistor 152, the signal potential is stored to capacitor 151, and this causes drive transistor 154 to go on. The drive TFT 154 goes on at conductance corresponding to the signal potential, current is supplied from power line 147, and the light emitting layer 137 emits at the desired brightness. The hole carrier layer 138 is a layer that makes it easier to insert a hole from the anode electrode layer to the light emitting layer 137. It should be noted that the emitted colors in this preferred embodiment of the invention are visible light, and the gray scale can be expressed based on voltage information from the respective signal line.

The EL pixel array 134 in the present embodiment is formed in the top to bottom sequence of the steps shown in FIGS. 6A through 6I, for example. The step sequence is (A) separation layer formation (FIG. 6A), (B) TFT element formation (FIG. 6B), (C) interlayer insulation film formation (FIG. 6C), (D) contact hole formation (FIG. 6D), (E) transparent electrode layer formation (FIG. 6E), (F) bank formation (FIG. 6F), (G) hole transport layer formation (FIG. 6G), (H) EL layer formation (FIG. 6H), and (I) electrode layer formation (FIG. 6I).

The separation layer is made, for example, of amorphous Si:H and exposed to laser light to separate the exposed area and remove the EL pixel array from the substrate. The separated EL pixel array 134 is wrapped on and affixed to the drum as shown in FIG. 3. The coating layer 145, charge generating layer 116, and charge transfer layer 118 are then formed in sequence to achieve the photoconductive drum 114.

Because the pixels of the internal light source are formed at home positions relative to the surface of the photoconductive drum 114, latent images can be formed with absolutely no shifting in the position of the pixels of the plural colors.

Regarding the sequence of latent image formation, the drum is charged by the charger 120Y for the first color (yellow) to form a latent image using light from the internal light source 124 based on the yellow image signal and the latent image is developed by the developer 122Y when the starting position of the photoconductive drum 114 passes the cleaning section 128 as the photoconductive drum 114 rotates at a constant speed; the drum is then charged by the charger 120M for the next color (M) and the latent image is rewritten based on the M image signal; and this is accomplished for each color. In other words, charging and developing for each color proceed at the same time during image formation.

Operation of the present embodiment is described next below.

When a print command is received, the photoconductive drum 114 turns first, and the starting position, that is, when the edge joint where X driver 144CX overlaps when the EL pixel array 134 is wrapped to the drum passes the cleaning section 128, is detected.

The clock starts at this time, and at time ty seconds, tm seconds, tc seconds, and tk seconds charging, latent image formation (EL emission), and developing (toner supply) starts for each color. Times ty seconds, tm seconds, tc seconds, and tk seconds are determined by the distance from the initial position to the charger 120 for the respective color, and the linear velocity of the photoconductive drum 114; if the chargers 120 are equidistantly spaced, the time interval distance α of each color will be the same. That is, charging by charger 120Y starts at ty seconds after the initial position is passed, charging by charger 120M then starts after a specific time α passes (at tm seconds passed the initial position), charging by charger 120C then starts after another time α passes (tc seconds passed the initial position), and charging by charger 120K then starts after another time α passes (tk seconds passed the initial position).

Synchronized to when the starting position of the photoconductive drum 114 passes transfer section 126, sheet medium 108 is taken from paper supply tray 106 and the leading edge thereof enters transfer section 126. As a result, it is combined with the image area of the photoconductive drum 114 on which toner of each color is layered, and pressed to the drum with a predetermined pressure. The transfer section 126 is charged with a positive potential at this time so that the negatively charged toner transfers easily to sheet medium 108. The toner is thus reliably transferred to the sheet medium 108.

The sheet medium 108 is then advanced to the fixing section 130 for the next step, and is ejected to the eject tray 132 after fixing. The initial position of the photoconductive drum 114 then reaches the cleaning section 128 and the next print command is awaited.

Unlike a conventional internal light source using an LED, a mechanism for moving in the primary scanning direction is not needed and elements causing the position of each color image to shift are completely eliminated in the present embodiment because an EL pixel array 134 affixed to the entire circumferential surface of the photoconductive drum 114 is used as the internal light source 124, and pixels controllable by TFT layer 144 are arrayed throughout the image formation area of the photoconductive drum 114. There is, therefore, absolutely no color shifting in full color images, and high quality images can be achieved.

Furthermore, there is a timing at which charging, latent image formation, and developing are accomplished for each color in the above image formation control, and the processing time can thus be shortened compared with conventional multiple rotation or tandem exposure methods.

It should be noted that a low profile printer can be further achieved with the present invention by using a flatbed exposure section, arraying the EL pixel array 134 therebelow as the light source, disposing the charger and developer for each color, the transfer section, and fusing section thereabove, and moving the flatbed exposure section at a constant speed side to side to form an image.

Furthermore, the process described in Information Display (November 1999, pp. 12 to 15) can be used to manufacture the EL pixel array 134. More specifically, after forming plural TFT elements or EL elements in which the pixels of the pixel array are formed on a semiconductor wafer or other desirable substrate, these are separated into small chips. Channels matching these small chips are then formed in an array pattern on the drum. The chips are then dispersed in a suitable solution, the solution is supplied to the drum, the chips are matched to the channels, and plural pixel arrays are obtained in a drum shape. With this method it is possible to easily arrange pixels having uniform performance on a curved surface such as that of a drum.

Effect of the Invention

As described above, a printer according to the present invention does not require primary scanning or other operation by the light source in an internal exposure method, and has the outstanding effect of dramatically improving the positioning of each color.

What is claimed is:

1. A method of manufacturing a printer with an EL pixel array as a latent image light source, comprising:

(a) forming an EL pixel array on a substrate;

(b) separating said EL pixel array from the substrate;

(c) affixing said separated EL pixel array to substantially completely surround the outside of a photoconductive drum;

(d) forming a charge generating layer above said EL pixel array; and (e) forming a charge transfer layer above said charge generating layer.

* * * * *